Sept. 15, 1931. H. A. HUSTED 1,823,562
METHOD OF FORMING STEERING WHEELS
Filed Jan. 7, 1929 3 Sheets-Sheet 1

INVENTOR
HARRY A. HUSTED
BY
Evans and McCoy
ATTORNEY

Sept. 15, 1931.   H. A. HUSTED   1,823,562
METHOD OF FORMING STEERING WHEELS
Filed Jan. 7, 1929   3 Sheets-Sheet 2

INVENTOR
HARRY A. HUSTED
BY
Evans and McCoy
ATTORNEY

Sept. 15, 1931.   H. A. HUSTED   1,823,562
METHOD OF FORMING STEERING WHEELS
Filed Jan. 7, 1929   3 Sheets-Sheet 3
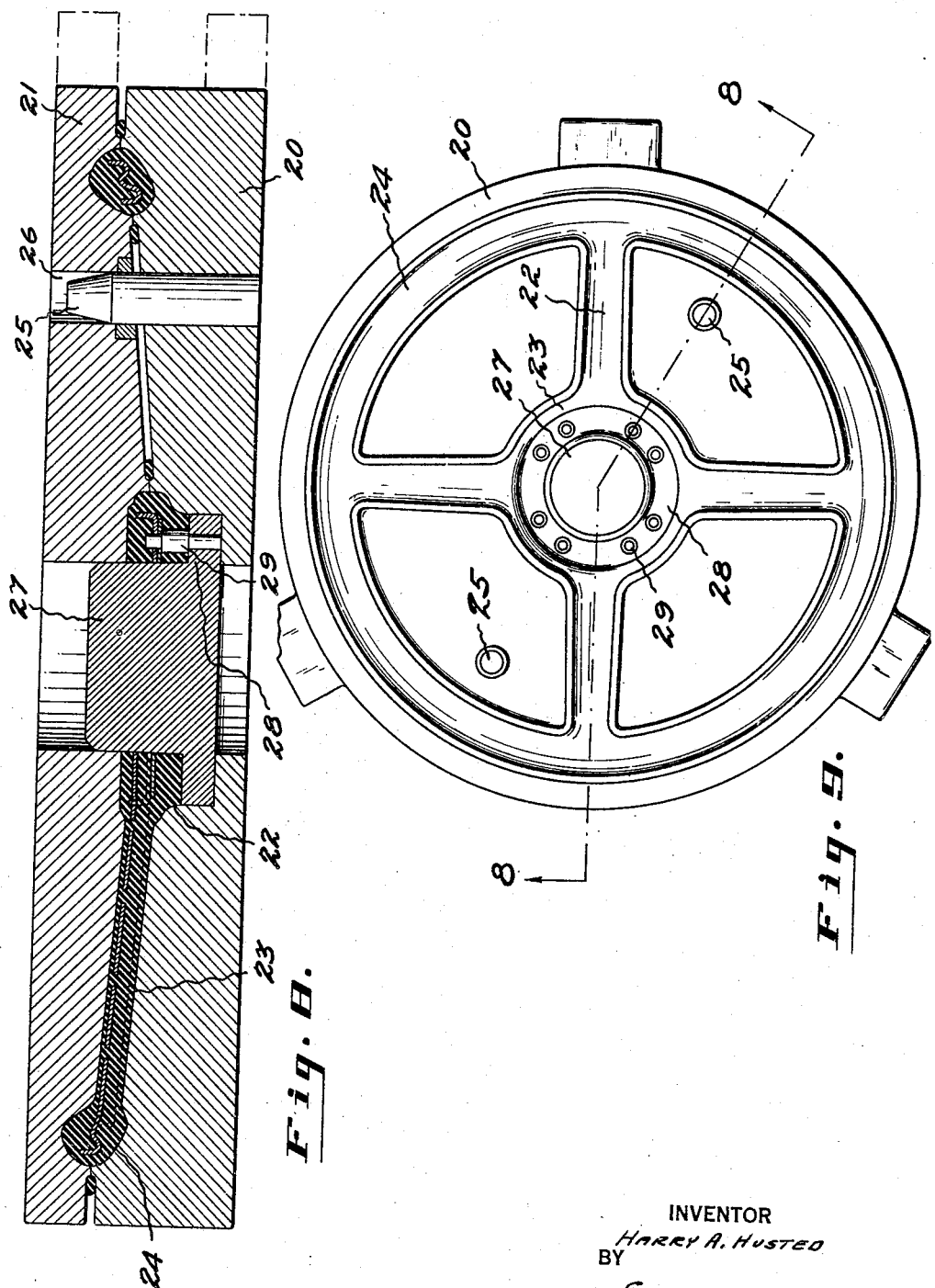
INVENTOR
HARRY A. HUSTED
BY
Evans and McCoy
ATTORNEY Patented Sept. 15, 1931

1,823,562

UNITED STATES PATENT OFFICE

HARRY A. HUSTED, OF CLEVELAND, OHIO, ASSIGNOR TO THE H. A. HUSTED COMPANY, OF DETROIT, MICHIGAN, A CORPORATION OF MICHIGAN

METHOD OF FORMING STEERING WHEELS

Application filed January 7, 1929. Serial No. 330,781.

This invention relates to steering wheels and a method of forming the same, and particularly to steering wheels of the reinforced composition material type.

The principal object is to provide a reinforced composition steering wheel which is extremely rigid in construction, neat in appearance, and easy to manufacture.

Another object is to provide a composition steering wheel with a reinforcing spider which is provided with means disposed at its hub portion for preventing distortion of the spider during the molding process.

Another object is to provide a method of forming reinforced composition steering wheels whereby the hub portion of the reinforcing spider is provided with means to prevent distortion of the same while the composition material is being molded around the same.

A further object is to provide a method of forming composition steering wheels having reinforcing spiders provided with corrugations extending radially from the hub portion thereof, whereby the corrugations in the hub portion are bridged with means to prevent distortion of the same during the operation of molding the rubber therearound.

These being among the objects of the present invention, the same consists of certain methods and operations to be hereinafter described with reference to the accompanying drawings, and then claimed, having the above and other objects in view.

In the accompanying drawings which illustrate a suitable embodiment of the present invention:

Fig. 8 is a section through the forming molds showing the composition material compressed around the reinforcing spider; and Fig. 9 is a plan view of the lower section of the forming mold.

In my copending application filed February 11, 1927, and serially numbered 167,387, a steering wheel is described and claimed which comprises a single piece reinforcing spider around which a composition material is molded and bonded to all surfaces thereof. The reinforcing spider is preferably formed from a single metal plate to provide integral rim, spoke and hub portions, which are suitably flanged, channeled and beaded to provide substantially uniform strength throughout every portion of the wheel, so that in the event of a serious wreck, the driver of the vehicle will not be injured by the breakage of the steering wheel.

In this spider, the spokes are provided with longitudinal depressions which extend through the hub to the central opening therein. It has been found that when the composition material is molded around the spider, the spider hub is distorted by the pressure exerted in bringing the mold sections together to compress the composition material. This distortion of the hub is produced by the tendency of the metal forming the depressions in the hub to flatten out and assume a plane surface under the influence of the molding pressure. Distortion of the reinforcing spider during the molding process is very objectionable and produces greatly inferior wheels unsuitable for general use as will be apparent to those skilled in the art.

The present invention aims to provide a composition steering wheel and a method of forming the same whereby the reinforcing spider is prevented from being distorted during the molding of the composition material around the same.

Figure 1:
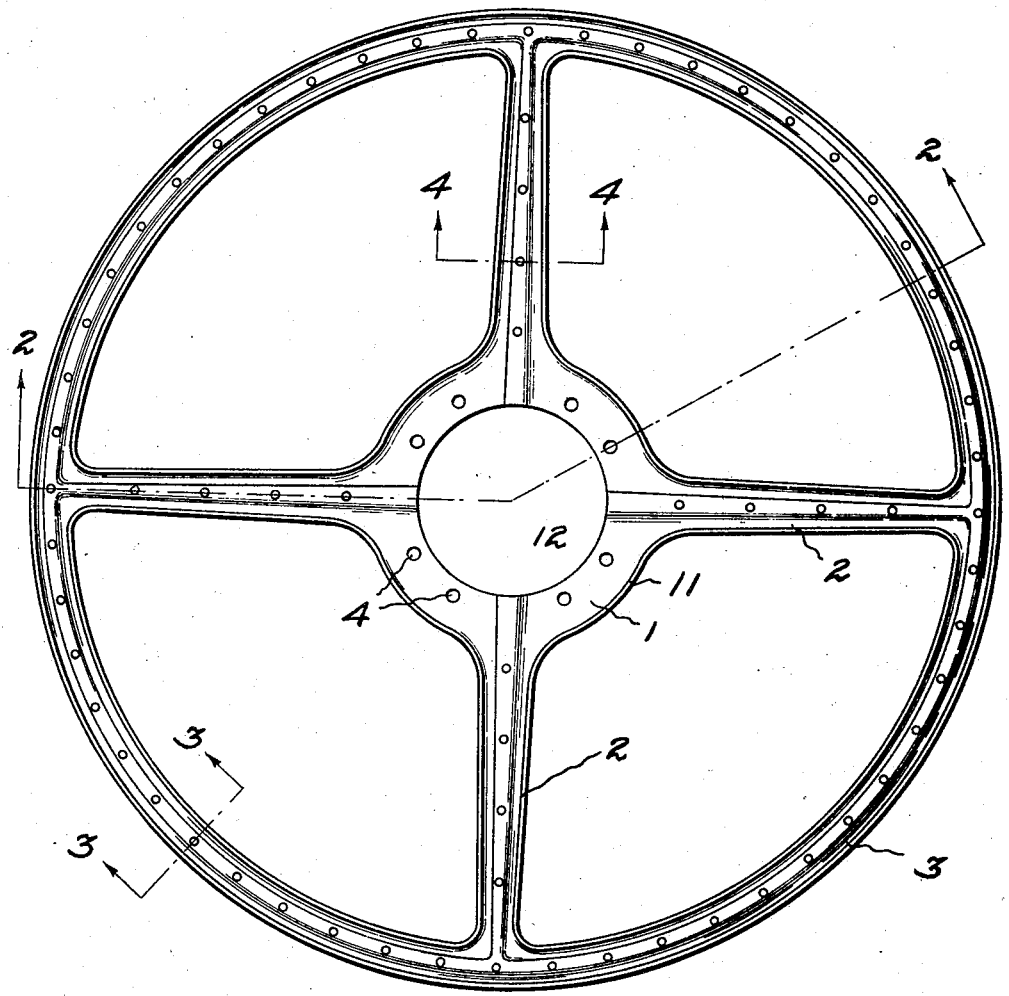
Figure 1 is a plan view of the metal reinforcing spider.
Figure 2:
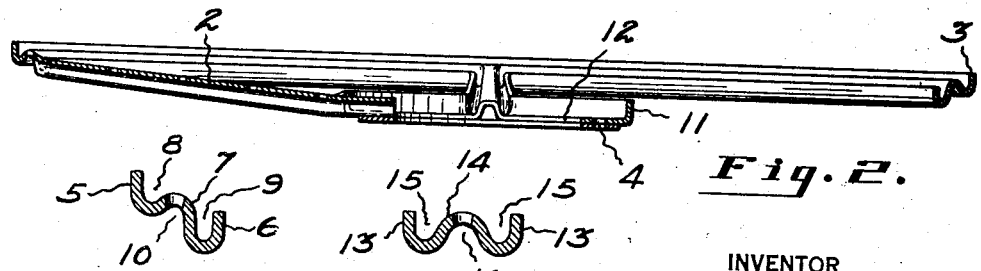
Fig. 2 is a section of the spider taken on the line 2—2 of Fig. 1.
Figures 3, 4:
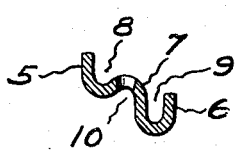
Fig. 3 is an enlarged section through the spider rim taken on the line 3—3 of Fig. 1.
Fig. 4 is an enlarged section through one of the spider spokes taken on the line 4—4 of Fig. 1.

Referring to the accompanying drawings in which like numerals refer to like parts throughout the several views, the reinforcing spider shown in Figs. 1 and 2 is preferably stamped from a single metal plate, and is provided with a central hub portion 1, spokes 2 radiating therefrom, and a continuous rim portion 3 integrally united with the spokes 2. The hub 1 is formed with a series of concentrically arranged openings 4 which receive the bolts that secure a separately formed wheel hub to the steering wheel when a separately formed hub unit is employed. The rim 3 of the spider has a continuous upwardly extending outer flange 5, inner upwardly extending flanges 6 along the inner edges thereof, and a continuous upwardly extending bead 7 formed in the web thereof intermediate the flanges 5 and 6. As shown in Fig. 3, the outer flange 5 is stepped in relation to the inner flanges 6, and this cross sectional shape provides the rim 3 with spaced upwardly presenting channels 8 and 9 and a downwardly presenting depression 10. The hub 1 of the spider as shown in Figs. 1 and 2 is formed with upwardly projecting flanges 11 around the outer edges thereof and with a large central opening 12. The spokes 2 of the spider, like the rim 3, are formed with upwardly projecting side flanges 13 and an upwardly extending longitudinal bead 14 intermediate the flanges 13, the side flanges 13 thereof being continuous with the hub flanges 11 and rim inner flanges 6, and the longitudinal beads 14 being continuous with the bead 7 of the rim 3. The cross section of the spokes 2, as shown in Fig. 4, may be described as being W-shaped, and having spaced upwardly presenting channels 15 branching into the rim channel 9 and a lower downwardly presenting depression 16 continuous with the rim depression 10. The beads 14 of the spokes 2 caused by the formation of the depression 16 therein, extend through the hub portion and terminate at the central hub opening 12. The spider is in this way uniformly strengthened by the continuous flanges and beads.

Figure 5:
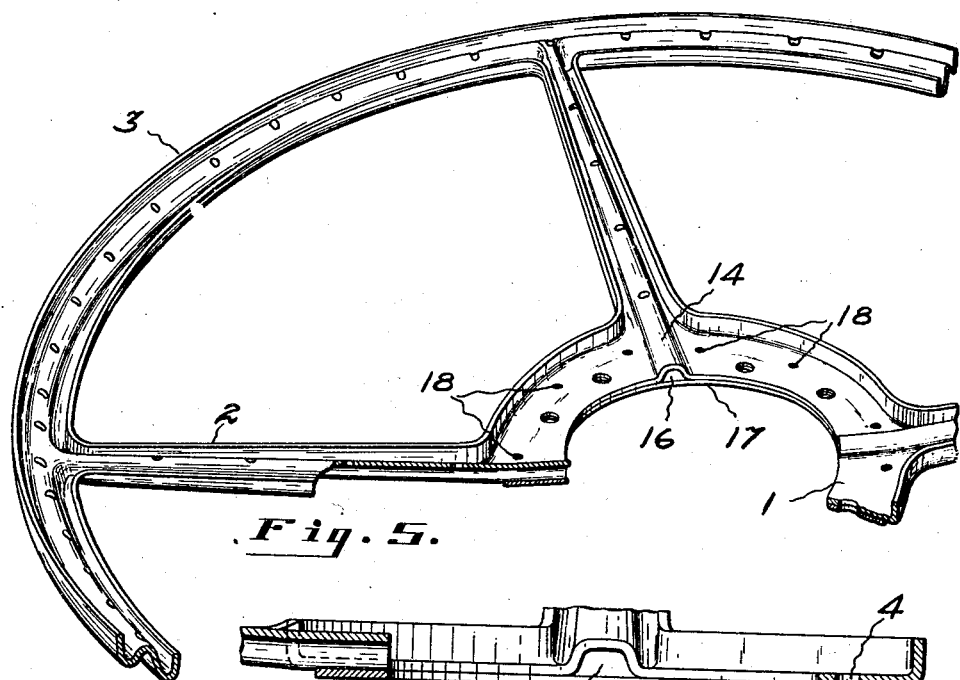
Fig. 5 is an enlarged fragmentary perspective view of the reinforcing spider showing the hub plate.
Figure 6:
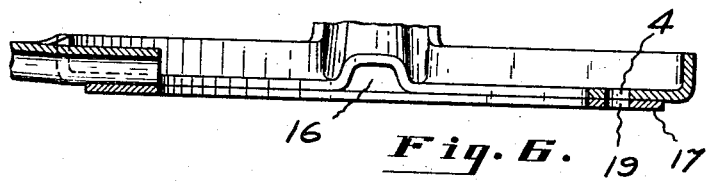
Fig. 6 is an enlarged fragmentary sectional view of the hub portion of the reinforcing spider.
Figure 7:
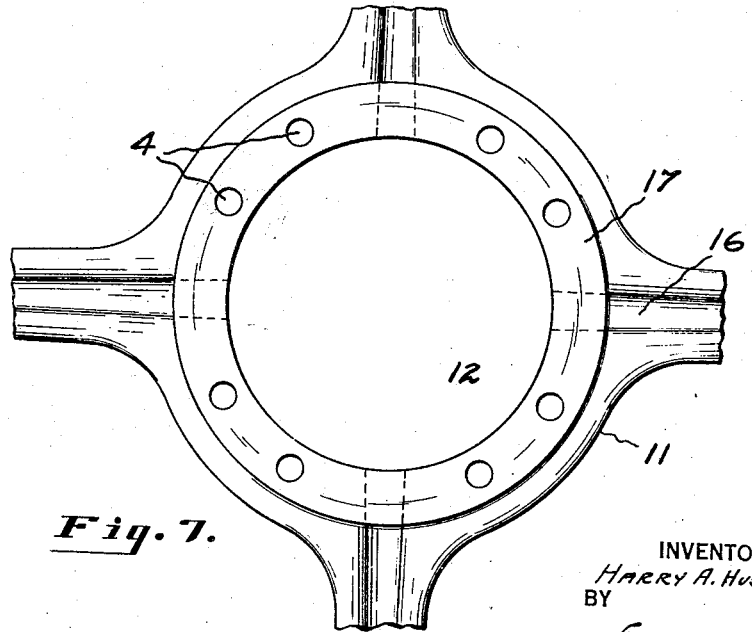
Fig. 7 is an enlarged fragmentary plan view of the lower side of the spider hub showing the hub plate positioned thereon.

An annular plate 17 is seated against the lower face of the hub portion 1 of the spider substantially as shown in Figs. 5, 6 and 7, so that it bridges the spoke depressions 16 which extend through the hub to the central opening 12 thereof. This plate 17 then is preferably spot welded to the hub 1 at points adjacent the sides of the spoke beads 14 produced by the formation of the depressions, substantially as indicated by the weld marks 18 in Fig. 5. It is to be understood however that the plate 17 may be secured to the hub 1 by rivets or any other suitable means. The plate 17 is formed with a series of openings 19 which are axially in line with the openings 4 in the hub through which the hub securing screws may extend. These openings 19 are preferably formed after the plate 17 is welded or otherwise secured in place. The plate 17 has a secondary purpose of providing a greater thickness of metal for the hub securing screws. The primary purpose of the plate 17, however, is to provide means for bridging the depressions 16 to prevent distortion of the hub during the operation of forming the composition material around the spider. The function of this plate will be more fully described later in the specification.

The steering wheel is formed, as previously mentioned, by compressing and bonding a composition material to the reinforcing spider. The characteristics of the composition material are preferably such that the material will flow or be rendered workable when subjected to heat and pressure. The forming of the composition material around the spider is accomplished by the use of a heated mold which is adapted to compress the material around and bond or vulcanize the same to the spider. One embodiment of this mold is shown in Figs. 8 and 9 and comprises lower and upper mold sections 20 and 21 respectively. Each mold section is formed with continuous hub, spoke and rim depressions 23, 22 and 24 which, when the sections are brought together in closed relationship form cavities conforming in shape to the shape of the finished wheel. The lower mold section is provided with large diametrically opposite, upwardly extending dowel pins 25 adapted to register with openings 26 in the upper mold section 21 and prevent displacement of one section relative to the other. The lower mold section 20 is also provided with a central registering plug 27 which forms the wall of the hub cavity, and in addition centers the spider when it is positioned within the mold cavity. The registering plug 27 has an annular flange 28 which is provided with a plurality of circularly arranged pins 29 which extend upwardly into the hub cavity of this mold and project through the hub openings 4 of the spider to prevent the composition material from closing in the openings 4 and to prevent rotational movement of the spider relative to the mold sections so that the same is positioned correctly within the mold cavity.

Composition material elements are first positioned within the hub, spoke and rim depressions 23, 22 and 24 respectively of the lower mold section 20, and the reinforcing spider is then positioned on these elements with the pins 29 extending through the hub and reinforcing plate openings 4 and 19. Component composition material elements are next seated upon the hub, spokes and rim of the spider, and the upper mold section 21 is finally assembled to the lower section 20. The mold sections being held at a temperature suitable for vulcanizing or bonding the composition material to the spider, are moved toward each other preferably by hydraulic pressure to compress the composition material so that it completely fills the mold cavities and intimately contacts with the surfaces of the spider. The sections are left in closed position a sufficient length of time to permit the composition material to become vulcanized or bonded to the surfaces of the spider. A great portion of the gases produced during the molding of the composition material flow along the depressions 16 and channels 15 of the spider spokes 2 and are liberated adjacent to the registering plug 27 at the central hub opening 12.

Considerable pressure is exerted by the mold sections to compress the composition material and it is apparent that this pressure tends to flatten out the beads 14 which would distort the spider if the plate 17 were not used. This would result in an inferior product. With applicant's structure this cannot happen because the plate 17 is rigidly attached to the hub of the spider on each side of and bridges the depressions 16. This plate 17 therefore provides a spider hub 1 in which pressures exerted against the beads 14 do not distort the same. It can be easily seen by one skilled in the art that this feature presents many advantages.

From the foregoing description it can be seen that the several steps of the present invention broadly consist of the following operations:

(1) The formation of a reinforcing spider having channels and depressions therein.
(2) The securing of a plate to the spider hub bridging channels formed in the hub to prevent distortion of the spider; and (3) the molding of composition material around the spider under great pressure to form a finished steering wheel.

It will be apparent from the drawings and foregoing description that the present invention provides a composition steering wheel and a method of forming the same which satisfactorily eliminates objectionable distortion of the wheel spider during the molding operation. Further, that the means provided for restraining the spider against distortion adds very little to the cost of making the wheel.

Furthermore, it is to be understood that the sections of the reinforcing spider shown and described, and the particular procedure set forth, are presented for purposes of explanation and illustration and that various modifications of said spider and procedure can be made without departing from the spirit and substance of the broad invention, the scope of which is commensurate with the appended claims.

What I claim is:

1. The method of forming a molded composition steering wheel, which consists in forming a reinforcing spider with radial depressions in the hub thereof, securing a plate to the hub of said spider at opposite sides of the depressions to bridge and restrain the same against distortion during a subsequent molding operation, and molding composition material around said spider.

2. The method of forming a steering wheel, which consists in forming a reinforcing spider with depressions in the hub thereof, bridging said depressions with a plate to restrain said hub against distortion during the subsequent molding operation, and molding composition material around said spider under pressure.

3. The method of forming a steering wheel, which consists in forming a reinforcing spider from a single piece of metal, forming radial depressions in the hub of said spider, securing an annular plate to said hub to bridge said depressions for restraining said hub against distortion during the subsequent operation, and molding composition material around said spider under pressure.

4. The method of forming a steering wheel, which consists in forming a reinforcing spider from a single metal plate to provide integral rim, spoke and hub portions, forming longitudinal strengthening depressions in the spokes extending through said hub, securing an annular plate to said hub to bridge said depressions for restraining said hub against distortion during the subsequent forming operation, and molding composition material under pressure around and bonding the same to said reinforcing spider.

5. The method of forming steering wheels, which consists in forming a one-piece metal reinforcing spider having integral rim, spoke and hub portions, forming strengthening depressions in said spider radiating from the inner edge of said hub portion into said spoke portions, securing an annular plate to said hub to bridge said depressions therein for restraining said hub against distortion during the subsequent forming operation, supporting said spider in a mold cavity between component composition material elements, and forcing said composition material to surround and become bonded to said spider, and to fill said mold cavities.

In testimony whereof I affix my signature.

HARRY A. HUSTED.